United States Patent
Nishikawa

(10) Patent No.: US 7,126,679 B2
(45) Date of Patent: Oct. 24, 2006

(54) DEVICE METHOD AND PROGRAM FOR MEASURING POLARIZATION MODE DISPERSION AND RECORDING MEDIUM RECORDING THE PROGRAM

(75) Inventor: Kenji Nishikawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 10/493,962

(22) PCT Filed: Oct. 30, 2002

(86) PCT No.: PCT/JP02/11299

§ 371 (c)(1),
(2), (4) Date: Jun. 6, 2005

(65) Prior Publication Data

US 2005/0225746 A1    Oct. 13, 2005

(51) Int. Cl.
*G01N 21/00* (2006.01)
(52) U.S. Cl. .................................... 356/73.1
(58) Field of Classification Search ............ None
See application file for complete search history.

(56) References Cited

U.S. PATENT DOCUMENTS 6,104,515 A * 8/2000 Cao .......................... 398/147
6,807,321 B1 * 10/2004 Madsen ....................... 385/11
6,856,710 B1 * 2/2005 Wein et al. .................. 385/11

FOREIGN PATENT DOCUMENTS

| JP | 9-72827 A | 3/1997 |
|---|---|---|
| JP | 9-264814 | 10/1997 |
| JP | 2000-329651 A | 11/2000 |

\* cited by examiner

*Primary Examiner*—Tu T. Nguyen
(74) *Attorney, Agent, or Firm*—Lowe Hauptman & Berner LLP

(57) ABSTRACT

A device for measuring a polarization mode dispersion which prevents a bias of polarization components is such that incident light is made in line with orthogonal polarization axes (a p'-polarization axis and an s'-polarization axis) which are the p-polarization axis and s-polarization axis rotated by a certain angle θ, and is made incident to the optical fiber. This prevents the bias of the power in the p-polarization component and s-polarization component in the output of the polarization separator and is similar to a situation wherein the incident light is made in line with the p-polarization axis and s-polarization axis, and can measure the polarization mode dispersion.

13 Claims, 7 Drawing Sheets

DEVICE METHOD AND PROGRAM FOR MEASURING POLARIZATION MODE DISPERSION AND RECORDING MEDIUM RECORDING THE PROGRAM

TECHNICAL FIELD

The present invention relates to measurement of a polarization mode dispersion of a device under test (DUT: Device Under Test) such as optical fibers used for optical communication.

BACKGROUND ART

Measurement of a polarization mode dispersion of optical fibers has been carried out conventionally. For example, Japanese Patent Laid-Open Publication (Kokai) No. H09-264814 describes a polarization mode dispersion measuring device for optical fibers. With reference to FIG. 7, a description will now be given of the device for measuring the polarization mode dispersion of optical fibers according to Japanese Patent Laid-Open Publication (Kokai) No. H09-264814.

First, the polarization mode dispersion $\tau_{PMD}$ of an optical fiber under test 104 is defined by the following equation (1):

$$\tau_{PMD} = 2\sqrt{\dot{\theta}^2 + \dot{\psi}_1^2 \cos^2\theta + \dot{\psi}_2^2 \sin^2\theta} \quad (1)$$

where $\theta$ is a polarization angle, $\psi_1$ is a phase shift in a certain direction on a plane perpendicular to the propagation direction of light, and $\psi_2$ is a phase shift in a direction orthogonal to $\psi_1$. On this occasion, a transfer function matrix [T] of the optical fiber under test 104 is defined by the following equation (2):

$$[T(\omega)] = \begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \quad (2)$$

where $|T_{ij}|$ is an amplitude of respective matrix elements, $\phi_{ij}$ is a phase shift of the respective matrix elements, and both of them are functions of an optical angular frequency $\omega$. Then, the parameters –, $\psi_1$, and $\psi_2$ in the equation (1) are respectively obtained by the following equations (3), (4), and (5):

$$\theta(\omega) = 0.5 \cos^{-1}(|T_{11}|^2 - |T_{21}|^2) \quad (3)$$

$$\psi_1(\omega) = (\phi_{11} - \phi_{22})/2 \quad (4)$$

$$\psi_2(\omega) = (\phi_{21} - \phi_{12} + \pi)/2 \quad (5)$$

Consequently, the polarization mode dispersion $\tau_{PMD}$ of the optical fiber under test 104 is obtained by obtaining the transfer function matrix [T] of the optical fiber under test 104.

A description will now be given of how to obtain the transfer function matrix [T] of the optical fiber under test 104 with reference to FIG. 7. First, a control unit 109 makes output light of a polarization controller 103 as a linearly polarized wave in line with a p direction of a polarization beam splitter 105 incident to the optical fiber under test 104. On this occasion, output light from the optical fiber under test 104 is represented by the following equation (6):

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 1 \\ 0 \end{bmatrix} = \begin{bmatrix} |T_{11}|e^{-j\phi_{11}} (p \text{ component}) \\ |T_{21}|e^{-j\phi_{21}} (s \text{ component}) \end{bmatrix} \quad (6)$$

The above-described output light is split into an s-polarization component and a p-polarization component by the polarization beam splitter 105, and then, the components are made incident to O/E converters $106_1$ and $106_2$ respectively, and the O/E converters $106_1$ and $106_2$ respectively measure:

$|T_{11}|e^{-j\phi_{11}}, |T_{21}|e^{-j\phi_{21}}$

After the above-described measurement, the control unit 109 rotates the output light of the polarization controller 103 by 90°, and makes the rotated light as a linearly polarized wave in line with an s direction in the polarization beam splitter 105 incident to the optical fiber under test 104. On this occasion, output light from the optical fiber under test 104 is represented by the following equation (7):

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 0 \\ 1 \end{bmatrix} = \begin{bmatrix} |T_{12}|e^{-j\phi_{12}} (p \text{ component}) \\ |T_{22}|e^{-j\phi_{22}} (s \text{ component}) \end{bmatrix} \quad (7)$$

The above-described output light is split into an s-polarization component and a p-polarization component by the polarization beam splitter 105, the components are made incident to the O/E converters $106_1$ and $106_2$ respectively, and the O/E converters $106_1$ and $106_2$ respectively measure:

$|T_{12}|e^{-j\phi_{12}}, |T_{22}|e^{-j\phi_{22}}$

A network analyzer 107 obtains $\theta$, $\psi_1$, and $\psi_2$ from the respective parameters measured as described above, and the equations (3), (4), and (5). It should be noted that the network analyzer 107 controls an intensity modulation ratio in an optical intensity modulator 102 through an amplifier 108.

Then, the above-described measurement is carried out while the output wavelength of a wavelength-variable light source 101 is being swept, thereby obtaining $\theta(\omega)$, $\psi_1(\omega)$, and $\psi_2(\omega)$ from the respective measurement results. Then, the control unit 109 obtains the polarization mode dispersion $\tau_{PMD}$ from the equation (1).

However, in the method described above, when the output light of the optical fiber under test 104 is separated into the s-polarization component and p-polarization component by the polarization beam splitter 105, the power may be biased. Namely, either the s-polarization component or the p-polarization component output from the polarization beam splitter 105 may be extremely larger than the other component. In even an extreme case, only the p-polarization component is output, and the s-polarization component is not output.

In this case, the S/N ratio of the phase of a component with a smaller power degrades, and the measurement of the phase hence becomes inaccurate. Consequently, a group delay and the polarization mode dispersion of the optical fiber under test 104 contain noise, and the measurement thereof hence becomes inaccurate.

In view of the foregoing, an object of the present invention is to provide a polarization mode dispersion measuring device and the like which prevent the bias in the polarization components.

DISCLOSURE OF INVENTION

According to an aspect of the present invention, a polarization mode dispersion measuring device for measuring polarization mode dispersion of a device under test includes a polarization separating unit for receiving light having emitted from the device under test, separating the received light into p-polarized light and s-polarized light, and outputting the p-polarized light and s-polarized light; a light generating unit for generating incident light; an optical modulation unit for applying the incident light with intensity modulation, and emitting modulated light; a light input unit for making the incident light having been applied with the intensity modulation in line with orthogonal polarization axes which are the p-polarization axis and the s-polarization axis in the polarization separating unit rotated by a predetermined angle, and then, making the resulting incident light incident to the device under test; a measuring unit for measuring phase shift equivalent values and amplitude equivalent values of the incident light based on the output of the polarization separating unit; and a polarization mode dispersion measuring unity for measuring the polarization mode dispersion of the device under test based on the measurement result of the measuring unit.

According to the polarization mode dispersion measuring device constituted as described above, the incident light is made in line with the orthogonal polarization axes which are the p-polarization axis and s-polarization axis in the polarization separating means rotated by the predetermined angle, and then, is made incident to the device under test. Consequently, it is possible to prevent the bias of the power in the p-polarization component and s-polarization component in the output of the polarization separating means.

At the same time, the method which measures the polarization mode dispersion based on the result of making the incident light made in line with the orthogonal polarization axes incident to the device under test is similar to the method which measures the polarization mode dispersion based on the result of making the incident light made in line with the p-polarization axis and s-polarization axis in the polarization separating means incident to the device under test, and can measure the polarization mode dispersion.

According to the above aspect of the present invention in the polarization mode dispersion measuring device, the light input unit for making the incident light in line with the orthogonal polarization axes, further makes the incident light in line with the p-polarization axis and the s-polarization axis, and then, makes the resulting incident light incident to the device under test.

According to the above aspect of the present invention the polarization mode dispersion measuring device can be such that the predetermined angle is determined based on the measurement result of the measuring unit.

According to the above aspect of the present invention the polarization mode dispersion measuring device can be such that the phase shift equivalent value is obtained by differentiating a phase shift by an optical angular frequency.

According to the above aspect of the present invention the polarization mode dispersion measuring device can be such that the amplitude equivalent value is the square of an amplitude.

According to another aspect of the present invention, a polarization mode dispersion measuring method for measuring polarization mode dispersion of a device under test includes a polarization separating step of receiving light having emitted from the device under test, separating the received light into p-polarized light and s-polarized light, and outputting the p-polarized light and s-polarized light; a light generating step of generating incident light; an optical modulating step of applying the incident light with intensity modulation, and emitting modulated light; a light input step of making the incident light having been applied with the intensity modulation in line with orthogonal polarization axes which are the p-polarization axis and the s-polarization axis in the polarization separating step rotated by a predetermined angle, and then, making the resulting incident light incident to the device under test; a measuring step of measuring phase shift equivalent values and amplitude equivalent values of the incident light based on the output of the polarization separating step; and a polarization mode dispersion measuring step of measuring the polarization mode dispersion of the device under test based on the measurement result of the measuring step.

Another aspect of the present invention resides in the polarization mode dispersion measuring method, wherein there exist a plurality of the pairs of orthogonal polarization axes, and the polarization mode dispersion measuring step selects the measurement result used for the measurement of the polarization mode dispersion by comparing S/N ratios of measurement results corresponding to the respective pairs of orthogonal polarization axes.

Another aspect of the present invention resides in a polarization mode dispersion measuring method, wherein the light input step includes a step of making the incident light in line with the orthogonal polarization axes, and then, making the resulting incident light incident to the device under test, and a step of making the incident light in line with the p-polarization axis and the s-polarization axis, and then, making the resulting incident light incident to the device under test, and wherein the polarization mode dispersion measuring step selects the measurement result used for the measurement of the polarization mode dispersion by comparing an S/N ratio of the measurement result when the incident light is made in line with the orthogonal polarization axes, and an S/N ratio of the measurement result when the incident light is made in lien with the p-polarization axis and the s-polarization axis.

Another aspect of the present invention resides in a program of instructions for execution by the computer to perform a polarization mode dispersion measuring process of a polarization mode dispersion measuring device having a polarization separating unit for receiving light having emitted from the device under test, separating the received light into p-polarized light and s-polarized light, and outputting the p-polarized light and s-polarized light; a light generating unit for generating unit for generating incident light; an optical modulation unit for applying the incident light with intensity modulation, and emitting modulated light; a light input unit for making the incident light having been applied with the intensity modulation in line with orthogonal polarization axes which are the p-polarization axis and the s-polarization axis in the polarization separating unity rotated by a predetermined angle, and then, making the resulting incident light incident to the device under test, the polarization mode dispersion measuring process including a measuring step for measuring phase shift equivalent values and amplitude equivalent values of the incident light based on the output of the polarization separating step; and a polarization mode dispersion measuring step for measuring the polarization mode dispersion of the device under test based on the measurement result of the measuring step.

Yet another aspect of the present invention resides in a computer-readable medium having a program of instructions for execution by the computer to perform a polarization mode dispersion measuring process of a polarization mode dispersion measuring device having a polarization separating unit for receiving light having emitted from the device under test, separating the received light into p-polarized light and s-polarized light, and outputting the p-polarized light and s-polarized light; a light generating unit for generating incident light; an optical modulation unit for applying the incident light with intensity modulation, and emitting modulated light; a light input unit for making the incident light having been applied with the intensity modulation in line with orthogonal polarization axes which are the p-polarization axis and the s-polarization axis in the polarization separating unit rotated by a predetermined angle, and then, making the resulting incident light incident to the device under test, the polarization mode dispersion measuring process including a measuring step for measuring phase shift equivalent values and amplitude equivalent values of the incident light based on the output of the polarization separating step; and a polarization mode dispersion measuring step for measuring the polarization mode dispersion of the device under test based on the measurement result of the measuring step.

BEST MODE FOR CARRYING OUT THE INVENTION

Description will now be given of embodiments of the present invention with reference to drawings.

First Embodiment

Figure 1:
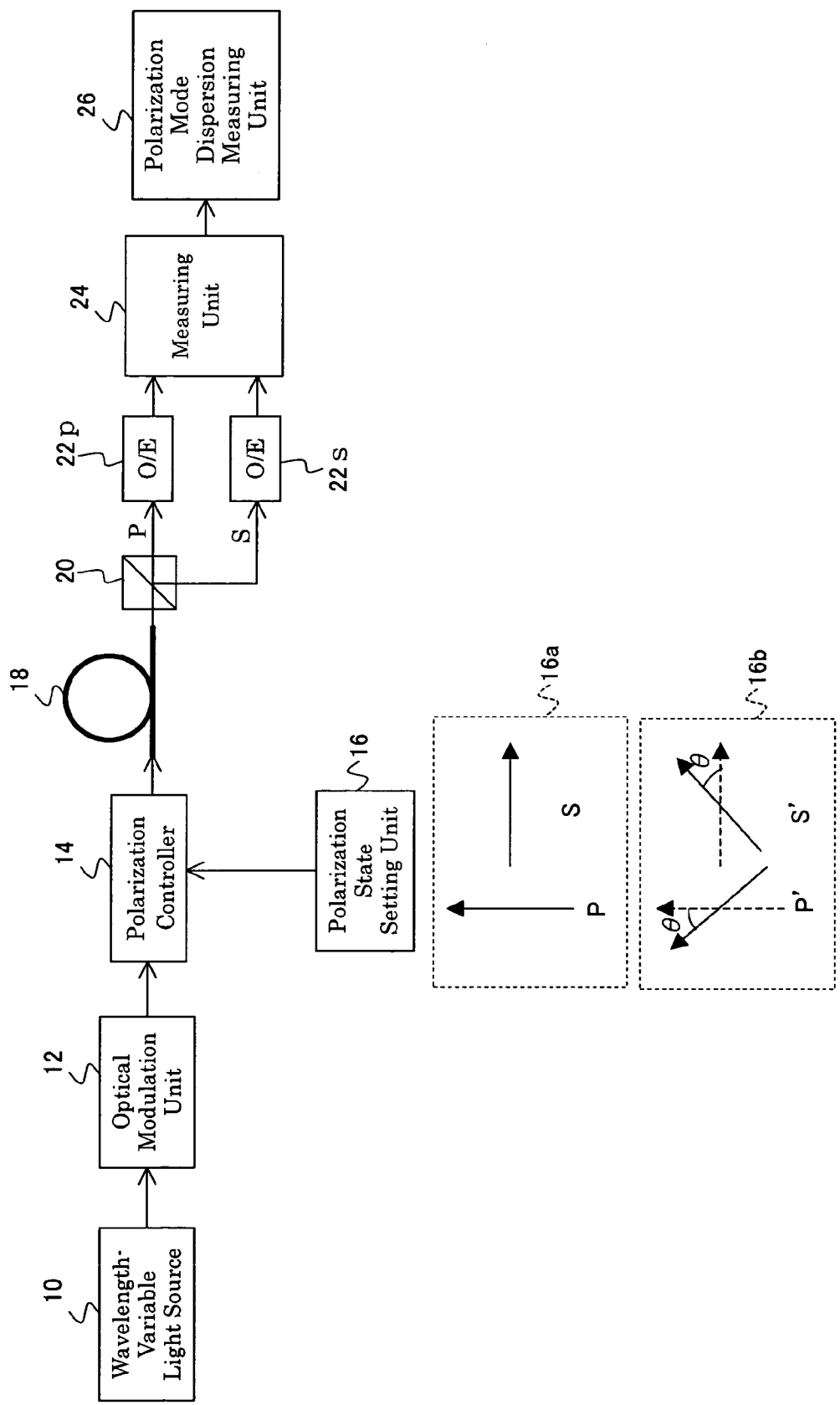
FIG. 1 is a block diagram showing the constitution of a polarization mode dispersion measuring device according to a first embodiment of the present invention.

FIG. 1 is a block diagram showing the constitution of a polarization mode dispersion measuring device according to a first embodiment of the present invention. The polarization mode dispersion measuring device according to the first embodiment of the present invention is intended for obtaining the polarization mode dispersion $\tau_{PMD}$ of an optical fiber 18, which is a device under test (DUT: Device Under Test).

The polarization mode dispersion measuring device according to the first embodiment of the present invention is provided with a wavelength-variable light source (light generating means) 10, an optical modulation unit 12, a polarization controller (light input means) 14, a polarization state setting unit 16, a polarization separator 20, optical/electrical (O/E) converters 22p and 22s, a measuring unit 24, and a polarization mode dispersion measuring unit 26.

The wavelength-variable light source 10 generates incident light while changing the wavelength thereof. It should be noted that an optical angular frequency $\omega=2\pi f=2\pi c/\lambda$, where c is the velocity of light, and $\lambda$ is its wavelength. Consequently, changing the wavelength $\lambda$ corresponds to changing the optical angular frequency $\omega$.

The optical modulation unit 12 applies intensity modulation to the incident light, and emits the modulated incident light to the polarization controller 14.

The polarization controller (light input means) 14 controls a polarization state of the incident light according to control by the polarization state setting unit 16.

The polarization state setting unit 16 sets the polarization state of the incident light. Namely, the polarization state setting unit 16 makes the incident light in line with a p-polarization axis and an s-polarization axis (16a) in the polarization separator 20. Namely, the polarization state setting unit 16 causes the incident light to be a linearly polarized wave which is in line with the p-polarization axis and s-polarization axis. In addition, the polarization state setting unit 16 makes the incident light in line with a p'-polarization axis and an s'-polarization axis, namely orthogonal polarization axes 16b. Namely, the polarization state setting unit 16 causes the incident light to be a linearly polarized wave which is in line with the p'-polarization axis and s'-polarization axis. It should be noted that the p'-polarization axis is the p-polarization axis turned by a predetermined angle of θ, and the s'-polarization axis is the s-polarization axis turned by the predetermined angle of θ. It should be noted that the predetermined angle θ may be arbitrarily set by a user of the polarization mode dispersion measuring device, or may be fixed (Mixed to θ=45° or 60°, for example).

When the incident light is made incident to the optical fiber 18, which is the device under test, the incident light passes through the optical fiber 18. The polarization separator 20 receives the light which has passed through the optical fiber 18, namely the light emitted from the optical fiber 18, separates the light into p-polarized light and s-polarized light, and outputs the polarized light.

The optical/electrical (O/E) converter 22p applies optical/electrical conversion to the p-polarization component in the output of the polarization separator 20, and outputs the converted component to the measuring unit 24. The optical/electrical (O/E) converter 22s applies optical/electrical conversion to the s-polarization component in the output of the polarization separator 20, and outputs the converted component to the measuring unit 24.

The measuring unit 24 measures phase shift equivalent values and amplitude equivalent values of the incident light based on the output of the polarization separator 20. The phase shift equivalent value is a value corresponding to the phase shift. Although the phase shift equivalent value may be the phase shift itself, a value obtained by differentiating the phase shift by the optical angular frequency is the phase shift equivalent value, for example. The amplitude equivalent value is a value corresponding to the amplitude. Although the amplitude equivalent value may be the amplitude itself, a value obtained by squaring the amplitude is the amplitude equivalent value, for example.

The polarization mode dispersion measuring unit 26 obtains the polarization mode dispersion $\tau_{PMD}$ of the optical fiber 18 based on the measurement result by the measuring unit 24.

A description will now be given of an operation of the polarization mode dispersion measuring device according to the first embodiment of the present invention with reference to a flowchart in FIG. 2.

Figure 3:
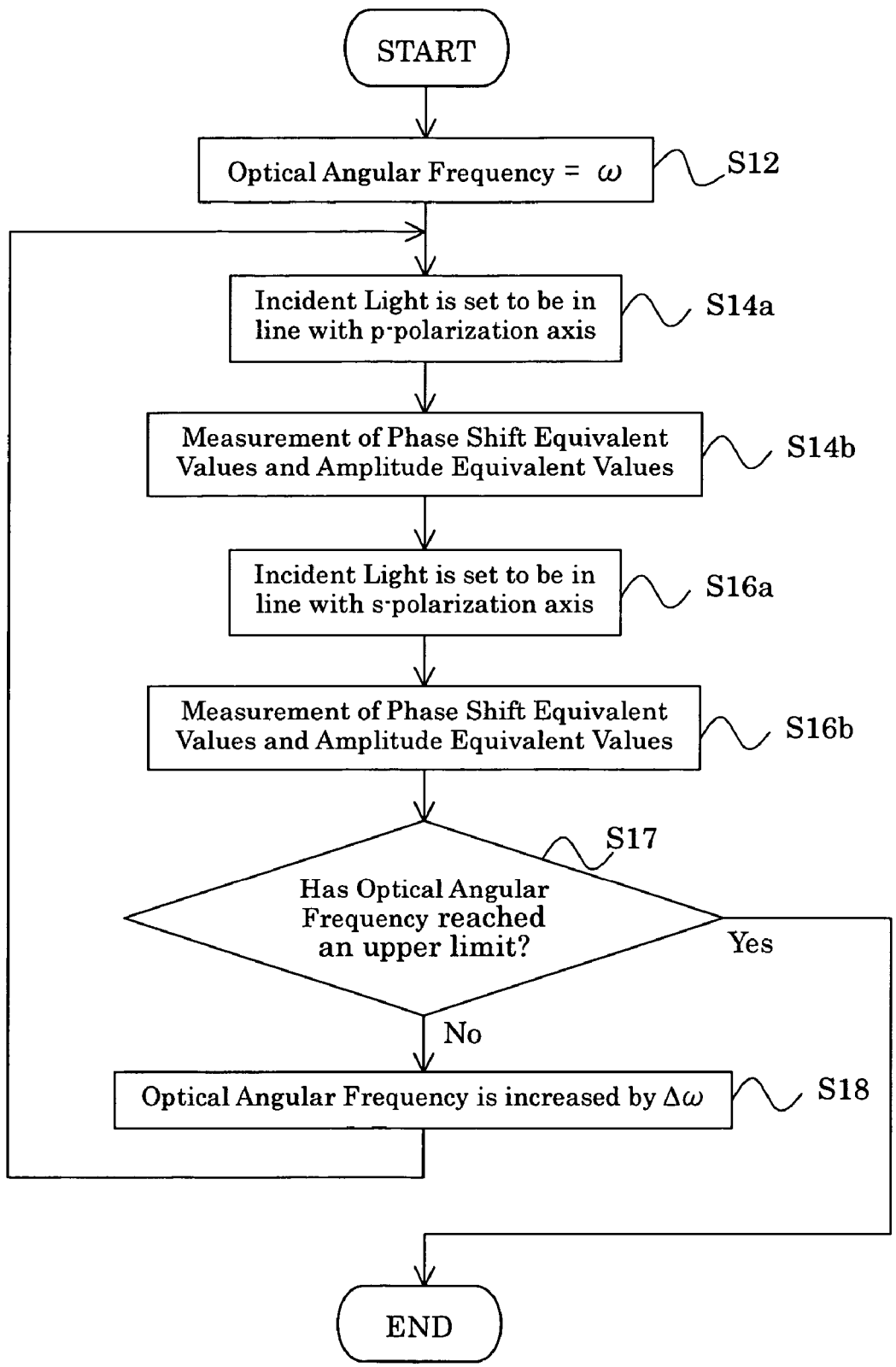
FIG. 3 is a flowchart showing the procedure for measuring the phase shift equivalent values and the amplitude equivalent values when the incident light is in line with the p-polarization axis and s-polarization axis (16a) in the polarization separator 20.

First, the phase shift equivalent values and the amplitude equivalent values are measured when the incident light is in line with the p-polarization axis and s-polarization axis (16*a*) in the polarization separator 20 (S10). A description will now be given of the procedure of this measurement with reference to a flowchart in FIG. 3.

First, the optical angular frequency of the light output by the wavelength-variable light source 10 is set to ω(S12). With reference to FIG. 1, the wavelength-variable light source 10 emits the incident light having the optical angular frequency ω. The incident light is applied with the intensity modulation by the optical modulation unit 12, and is emitted to the polarization controller 14. On this occasion, the polarization state setting unit 16 makes the incident light in line with the p-polarization axis in the polarization separator 20 (S14*a*). Namely, the polarization state setting unit 16 causes the incident light to be a linearly polarized wave which is in line with the p-polarization axis. Then, the incident light is made incident to the optical fiber 18.

The combined incident light having passed through the optical fiber 18 is separated into the p-polarized light and s-polarized light by the polarization separator 20. The p-polarization component output by the polarization separator 20 is applied with the optical/electrical conversion by the optical/electrical (O/E) converter 22*p*, and is output to the measuring unit 24. The s-polarization component output by the polarization separator 20 is applied with the optical/electrical conversion by the optical/electrical (O/E) converter 22*s*, and is output to the measuring unit 24. Then, the measuring unit 24 measures the phase shift equivalent values and the amplitude equivalent values (S14*b*).

A description will now be given of how to obtain the phase shift equivalent values and how to obtain the amplitude equivalent values (S14*b*).

First, a transfer function matrix [T] of the optical fiber 18 is defined by the following equation (10):

$$[T] = \begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \quad (10)$$

It should be noted that respective elements of the transfer function matrix [T] is represented by the following equations (11):

$$T_{11}e^{-j\theta_{11}} = U \cos \Theta e^{-j(\Phi_1+\phi+\psi)}$$

$$T_{12}e^{-j\theta_{12}} = -U \sin \Theta e^{-j(\Phi_1+\phi-\psi)}$$

$$T_{21}e^{-j\theta_{21}} = U \sin \Theta e^{-j(\Phi_1-\phi+\psi)}$$

$$T_{22}e^{-j\theta_{22}} = U \cos \Theta e^{-j(\Phi_1-\phi-\psi)} \quad (11)$$

where $\phi(\omega)$ is a difference component of two orthogonal phase shift components $\psi_1(\omega)$ and $\psi_2(\omega)$, and $\psi(\omega)$ is an in-phase component of the two orthogonal phase shift components $\psi_1(\omega)$ and $\psi_2(\omega)$. It should be noted that $\psi_1(\omega)$ is a phase shift in a certain direction on a plane perpendicular to the propagating direction of the light, and $\psi_2(\omega)$ is a phase shift in a direction orthogonal to $\psi_1$. Specifically, $\phi(\omega)=(\psi_1(\omega)-\psi_2(\omega))/2$, and $\phi(\omega)=(\psi_1(\omega)+\psi_2(\omega))/2$. In addition $\Theta(\omega)$ is the polarization angle of the light emitted from the optical fiber 18.

On this occasion, the incident light is made in line with the p-polarization axis in the polarization separator 20. Consequently, the output of the polarization separator 20 is represented by the following equation (12):

$$\begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \begin{bmatrix} 1 \\ 0 \end{bmatrix} = \begin{bmatrix} T_{11}e^{-j\theta_{11}} \\ T_{21}e^{-j\theta_{21}} \end{bmatrix} \begin{matrix} p \text{ component} \\ s \text{ component} \end{matrix} \quad (12)$$

Light of $T_{11}e^{-j\theta_{11}}$ is input to the measuring unit 24 through the optical/electrical (O/E) converter 22*p*. At the same time, light of $T_{21}e^{-j\theta_{21}}$ is input to the measuring unit 24 through the optical/electrical (O/E) converter 22*s*. Consequently, the measuring unit 24 can measure values equivalent to phase shifts $\theta_{11}$ and $\theta_{21}$ of $T_{11}e^{-j\theta_{11}}$ and $T_{21}e^{-j\theta_{21}}$ such as group delays $\tau_{11}(=d\theta_{11}/d\omega)$ and $\tau_{21}(=d\theta_{21}/d\omega)$, which are values obtained by respectively differentiating the phase shits $\theta_{11}$ and $\theta_{21}$ by the optical angular frequency ω, and values equivalent to amplitudes $|T_{11}|$ and $|T_{21}|$ such as $|T_{11}|^2$ and $|T_{21}|^2$ which are values obtained by respectively squaring the amplitudes. Namely, the measuring unit 24 can measure the phase shift equivalent values and the amplitude equivalent values on the first column of the transfer function matrix of the optical fiber 18.

Then, the polarization state setting unit 16 makes the incident light in line with the s-polarization axis (S16*a*) in the polarization separator 20. Namely, the polarization state setting unit 16 causes the incident light to be a linearly polarized wave which is in line with the s-polarization axis. Then, the incident light is made incident to the optical fiber 18.

The combined incident light having passed through the optical fiber 18 is separated into the p-polarized light and s-polarized light by the polarization separator 20. The p-polarization component output by the polarization separator 20 is applied with the optical/electrical conversion by the optical/electrical (O/E) converter 22*p*, and is output to the measuring unit 24. The s-polarization component output by the polarization separator 20 is applied with the optical/electrical conversion by the optical/electrical (O/E) converter 22*s*, and is output to the measuring unit 24. Then, the measuring unit 24 measures the phase shift equivalent values and the amplitude equivalent values (S16*b*).

A description will now be given of how to obtain the phase shift equivalent values and how to obtain the amplitude equivalent values (S16*b*). The incident light is made in line with the s-polarization axis in the polarization separator 20. Consequently, the output of the polarization separator 20 is represented by the following equation (13):

$$\begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \begin{bmatrix} 0 \\ 1 \end{bmatrix} = \begin{bmatrix} T_{12}e^{-j\theta_{12}} \\ T_{22}e^{-j\theta_{22}} \end{bmatrix} \begin{matrix} p \text{ component} \\ s \text{ component} \end{matrix} \quad (13)$$

Light of $T_{12}e^{-j\theta_{12}}$ is input to the measuring unit 24 through the optical/electrical (O/E) converter 22*p*. At the same time, light of $T_{22}e^{-j\theta_{22}}$ is input to the measuring unit 24 through the optical/electrical (O/E) converter 22*s*. Consequently, the measuring unit 24 can measure values equivalent to phase shifts $\theta_{12}$ and $\theta_{22}$ of $T_{12}e^{-j\theta_{12}}$ and $T_{22}e^{-j\theta_{22}}$ such as group delays $\tau_{12}(=d\theta_{12}/d\omega)$ and $\tau_{22}(=d\theta_{22}/d\omega)$, which are values obtained by respectively differentiating the phase shifts $\theta_{12}$ and $\theta_{22}$ by the optical angular frequency $\omega$, and values equivalent to amplitudes $|T_{12}|$ and $|T_{22}|$ such as $|T_{12}|^2$ and $|T_{22}|^2$ which are values obtained by respectively squaring the amplitudes. Namely, the measuring unit 24 can measure the phase shift equivalent values and the amplitude equivalent values on the second column of the transfer function matrix of the optical fiber 18.

Then, it is determined whether the optical angular frequency has reached an upper limit or not (S17), and if the upper limit has not been reached ("No" in S17), the optical angular frequency is increased by $\Delta\omega$(S18), and the procedure returns to the step of making the incident light in line with the p-polarization axis in the polarization separator 20 (S14a). If the optical angular frequency has reached the upper limit ("Yes" in S17), the measurement of the phase shift equivalent values and the amplitude equivalent values where the incident light is in line with the p-polarization axis and the s-polarization axis (16a) in the polarization separator 20 ends (see S10 in FIG. 2).

Figure 2:
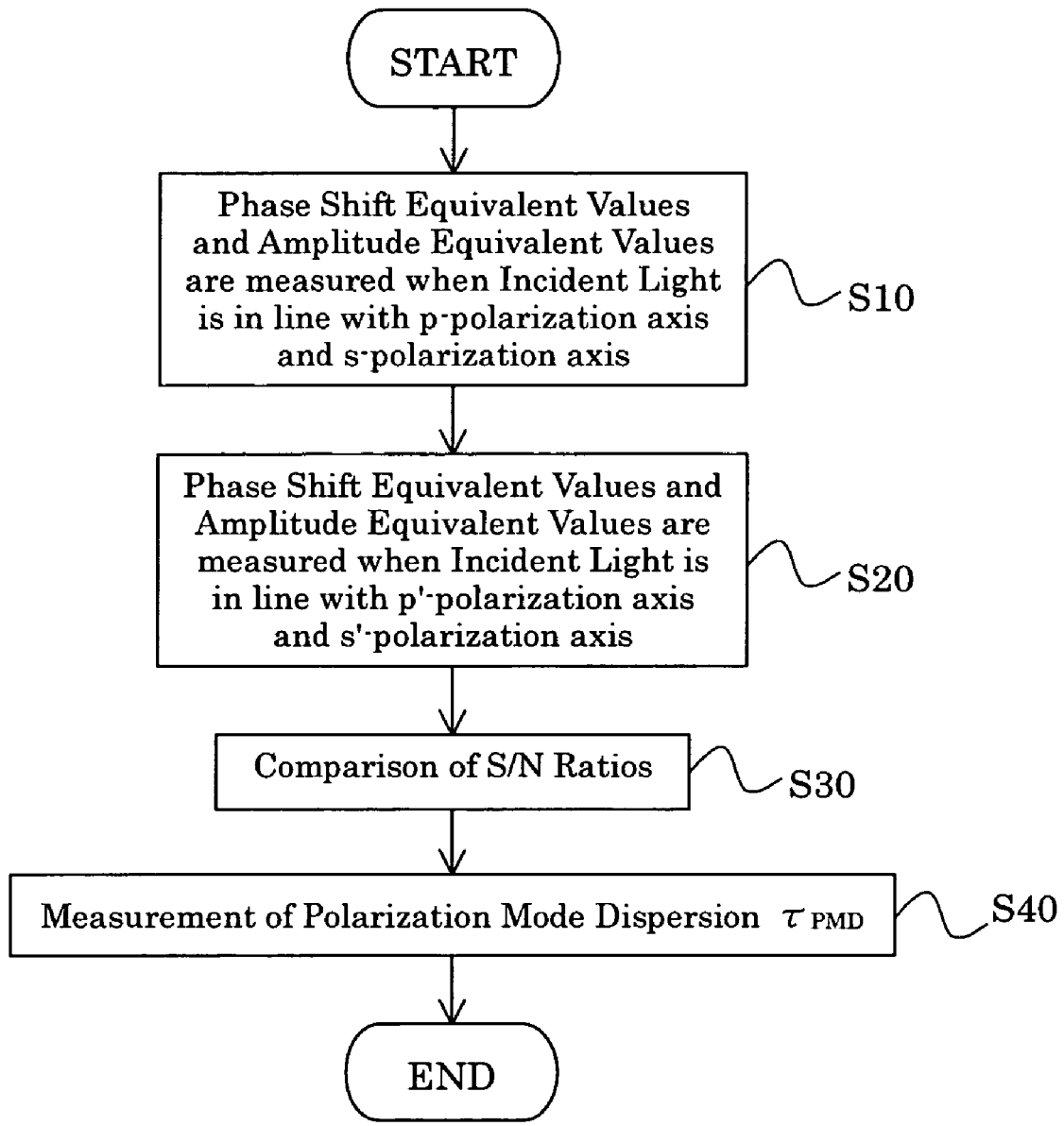
FIG. 2 is a flowchart showing an operation of the polarization mode dispersion measuring device according to the first embodiment of the present invention.
Figure 4:
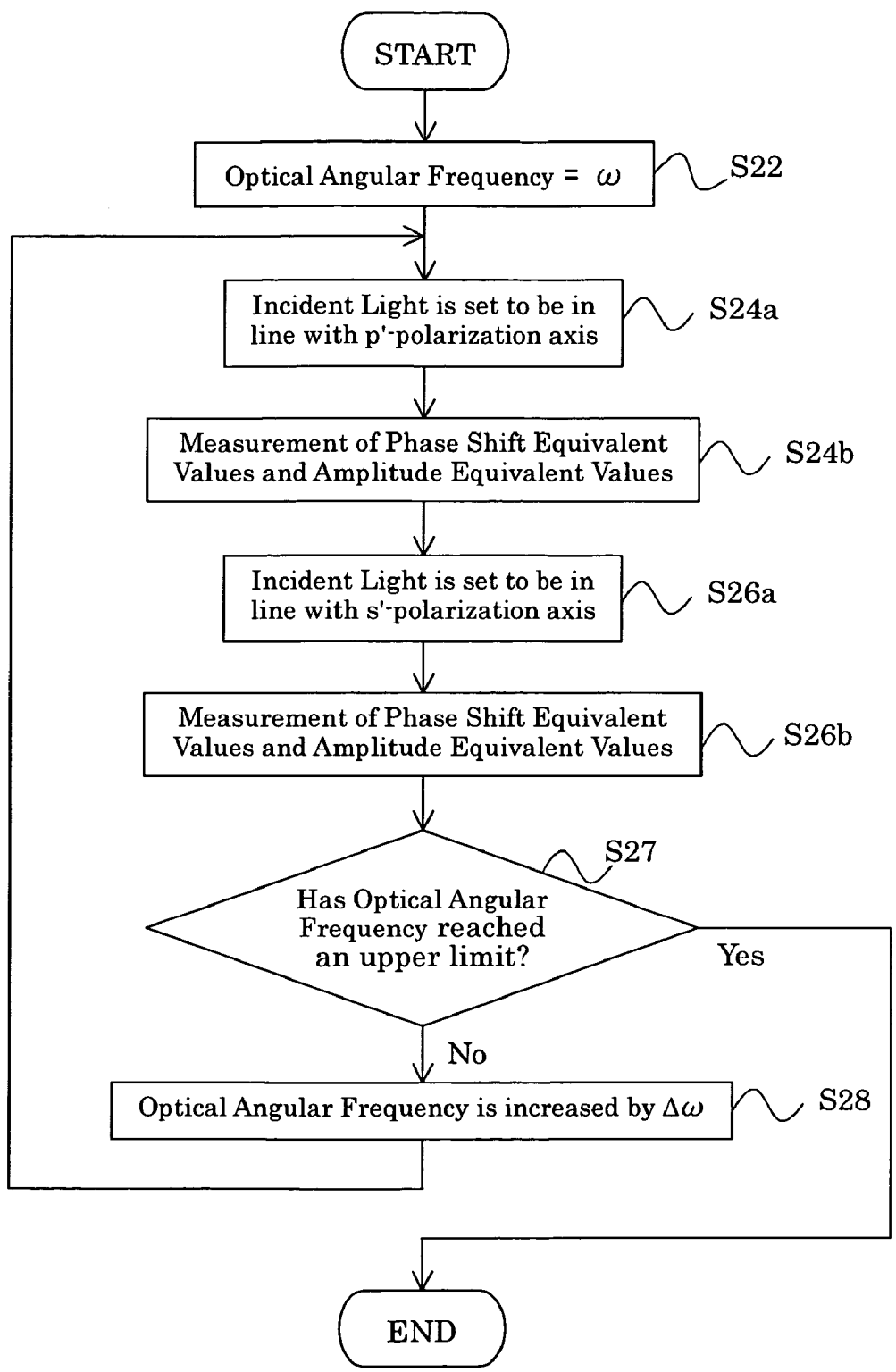
FIG. 4 is a flowchart showing the procedure for measuring the phase shift equivalent values and the amplitude equivalent values when the incident light is in line with the p'-polarization axis and s'-polarization axis in the polarization separator 20, namely the orthogonal polarization axes 16b.

Then the procedure returns to FIG. 2, and the measurement is carried out for phase shift equivalent values and amplitude equivalent values when the incident light is made in line with the p'-polarization axis and s'-polarization axis in the polarization separator 20, namely the orthogonal polarization axes 16b (S20). A description will now be given of the procedure of this measurement with reference to a flowchart in FIG. 4.

First, the optical angular frequency of the light output by the wavelength-variable light source 10 is set to $\omega$(S22). With reference to FIG. 1, the wavelength-variable light source 10 emits the incident light having the optical angular frequency $\omega$. The incident light is applied with the intensity modulation by the optical modulation unit 12, and is emitted to the polarization controller 14. On this occasion, the polarization state setting unit 16 makes the incident light in line with the p'-polarization axis of the polarization separator 20 (S24a). Namely, the polarization state setting unit 16 causes the incident light to be a linearly polarized wave which is in line with the p'-polarization axis. Then, the incident light is made incident to the optical fiber 18.

The combined incident light having passed through the optical fiber 18 is separated into the p-polarized light and s-polarized light by the polarization separator 20. The p-polarization component output by the polarization separator 20 is applied with the optical/electrical conversion by the optical/electrical (O/E) converter 22p, and is output to the measuring unit 24. The s-polarization component output by the polarization separator 20 is applied with the optical/ electrical conversion by the optical/electrical (O/E) converter 22s, and is output to the measuring unit 24. Then, the measuring unit 24 measures the phase shift equivalent values and the amplitude equivalent values (S24b).

A description will now be given of how to obtain the phase shift equivalent values and how to obtain the amplitude equivalent values (S24b).

On this occasion, the incident light is made in line with the p'-polarization axis in the polarization separator 20. Consequently, the output of the polarization separator 20 is represented by the following equation (14). It should be noted that $T_{11}e^{-j\theta_{11}}$ is simply represented as $T_{11}(\omega)$, for example, in the equation (14).

$$\begin{bmatrix} T_{11}(\omega) & T_{12}(\omega) \\ T_{21}(\omega) & T_{22}(\omega) \end{bmatrix} \begin{bmatrix} \cos\theta & -\sin\theta \\ \sin\theta & \cos\theta \end{bmatrix} \begin{bmatrix} 1 \\ 0 \end{bmatrix} = \begin{bmatrix} T'_{11} \\ T'_{21} \end{bmatrix} \begin{matrix} p \text{ component} \\ s \text{ component} \end{matrix} = \begin{bmatrix} T_{\theta 11}e^{-j\theta_{\theta 11}} \\ T_{\theta 21}e^{-j\theta_{\theta 21}} \end{bmatrix} \begin{matrix} p \text{ component} \\ s \text{ component} \end{matrix} \quad (14)$$

Light of $T'_{11}$ is input to the measuring unit 24 through the optical/electrical (O/E) converter 22p. At the same time, light of $T'_{21}$ is input to the measuring unit 24 through the optical/electrical (O/E) converter 22s. Consequently, the measuring unit 24 can measure values equivalent to phase shifts $\theta_{\theta 11}$ and $\theta_{\theta 21}$ of $T'_{11}$ and $T'_{21}$ such as group delays $\tau_{\theta 11}(=d\theta_{\theta 11}/d\omega)$ and $\tau_{\theta 21}(=d\theta_{\theta 21}/d\omega)$, which are values obtained by respectively differentiating the phase shifts $\theta_{\theta 11}$ and $\theta_{\theta 21}$ by the optical angular frequency $\omega$, and values equivalent to amplitudes $|T_{\theta 11}|$ and $|T_{\theta 21}|$ such as $|T_{\theta 11}|^2$ and $|T_{\theta 21}|^2$ which are values obtained by respectively squaring the amplitudes.

Then, the polarization state setting unit 16 makes the incident light in line with the s'-polarization axis in the polarization separator 20 (S26a). Namely, the polarization state setting unit 16 causes the incident light to be a linearly polarized wave which is in line with the s'-polarization axis. Then, the incident light is made incident to the optical fiber 18.

The combined incident light having passed through the optical fiber 18 is separated into the p-polarized light and s-polarized light by the polarization separator 20. The p-polarization component output by the polarization separator 20 is applied with the optical/electrical conversion by the optical/electrical (O/E) converter 22p, and is output to the measuring unit 24. The s-polarization component output by the polarization separator 20 is applied with the optical/ electrical conversion by the optical/electrical (O/E) converter 22s, and is output to the measuring unit 24. Then, the measuring unit 24 measures the phase shift equivalent values and the amplitude equivalent values (S26b).

A description will now be given of how to obtain the phase shift equivalent values and how to obtain the amplitude equivalent values (S26b). The incident light is made in line with the s'-polarization axis in the polarization separator 20. Consequently, the output of the polarization separator 20 is represented by the following equation (15). It should be noted that $T_{11}e^{-j\theta_{11}}$ is simply represented as $T_{11}(\omega)$, for example, in the equation (15):

$$\begin{bmatrix} T_{11}(\omega) & T_{12}(\omega) \\ T_{21}(\omega) & T_{22}(\omega) \end{bmatrix} \begin{bmatrix} \cos\theta & -\sin\theta \\ \sin\theta & \cos\theta \end{bmatrix} \begin{bmatrix} 0 \\ 1 \end{bmatrix} = \begin{bmatrix} T'_{12} \\ T'_{22} \end{bmatrix} \begin{matrix} p \text{ component} \\ s \text{ component} \end{matrix} = \begin{bmatrix} T_{\theta 12}e^{-j\theta_{\theta 12}} \\ T_{\theta 22}e^{-j\theta_{\theta 22}} \end{bmatrix} \begin{matrix} p \text{ component} \\ s \text{ component} \end{matrix} \quad (15)$$

Light of T'$_{12}$ is input to the measuring unit 24 through the optical/electrical (O/E) converter 22p. At the same time, light of T'$_{22}$ is input to the measuring unit 24 through the optical/electrical (O/E) converter 22s. Consequently, the measuring unit 24 can measure values equivalent to phase shifts $\theta_{\theta 12}$ and $\theta_{\theta 22}$ of T'$_{12}$ and T'$_{22}$ such as group delays $\tau_{\theta 12}(=d\theta_{\theta 12}/d\omega)$ and $\tau_{\theta 22}(=d\theta_{\theta 22}/d\omega)$, which are values obtained by respectively differentiating the phase shifts $\theta_{\theta 12}$ and $\theta_{\theta 22}$ by the optical angular frequency $\omega$, and values equivalent to amplitudes |T$_{\theta 12}$| and |T$_{\theta 22}$| such as |T$_{\theta 12}$|$^2$ and |T$_{\theta 22}$|$^2$ which are values obtained by respectively squaring the amplitudes.

Then, it is determined whether the optical angular frequency has reached an upper limit or not (S27), and if the upper limit has not been reached ("No" in S27), the optical angular frequency is increased by $\Delta\omega$(S28), and the procedure returns to the step of making the incident light in line with the p'-polarization axis in the polarization separator 20 (S24a). If the optical angular frequency has reached the upper limit ("Yes" in S27), the measurement of the phase shift equivalent values and the amplitude equivalent values where the incident light is in line with the p'-polarization axis and the s'-polarization axis (orthogonal polarization axes 16b) in the polarization separator 20 ends (see S20 in FIG. 2).

Now revisiting FIG. 2, comparison is carried out between S/N (Signal to Noise Ratio) ratios of the phase shift equivalent values and amplitude equivalent values when the incident light is made in line with the p-polarization axis and s-polarization axis (16a) in the polarization separator 20, and S/N (Signal to Noise Ratio) ratios of the phase shift equivalent values and amplitude equivalent values when the incident light is made in line with the p'-polarization axis and s'-polarization axis (orthogonal polarization axes 16b) in the polarization separator 20 (S30).

For example, it is assumed that when the incident light is made in line with the p-polarization axis and s-polarization axis (16a) in the polarization separator 20, only the p-polarization component is output, and no s-polarization component is output in the polarization separator 20. As a result, the S/N ratio of the output for the s-polarization component degrades. However, if the incident light is made in line with the p'-polarization axis and s'-polarization axis (orthogonal polarization axes 16b) in the polarization separator 20 (where $\theta$=45°), the p-polarization component and s-polarization component in the polarization separator 20 have similar amounts of the power. Therefore, it is possible to prevent the S/N ratios of the outputs of the p-polarization component and s-polarization component from degrading. Consequently, the better S/N ratios of the phase shift equivalent values and the amplitude equivalent values are obtained when the incident light is made in line with the p'-polarization axis and s'-polarization axis (orthogonal polarization axes 16b) in the polarization separator 20.

On this occasion, the measuring unit 24 outputs the phase shift equivalent values and the amplitude equivalent values with better S/N ratios, namely smaller noises to the polarization mode dispersion measuring unit 26, and then, the polarization mode dispersion $\tau_{PMD}$ is measured (S40).

If there are used the phase shift equivalent values and amplitude equivalent values when the incident light is made in line with the p-polarization axis and s-polarization axis (16a) in the polarization separator 20, the polarization mode dispersion $\tau_{PMD}$ is obtained using the following equations:

$$\tau_{PMD} = 2\sqrt{\alpha^2 + \beta^2 + \gamma^2 + 2\beta\gamma\cos 2\Theta} \quad (16)$$

wherein, $$\alpha = \frac{d}{d\omega}\Theta = \frac{1}{2}\frac{d}{d\omega}\left(\cos^{-1}\sqrt{\frac{|T_{11}|^2}{|T_{11}|^2 + |T_{21}|^2}}\right) \quad (17)$$

$$\beta = \frac{d}{d\omega}\phi = \frac{1}{4}(\tau_{11} - \tau_{22} + \tau_{12} - \tau_{21}) \quad (18)$$

$$\gamma = \frac{d}{d\omega}\psi = \frac{1}{4}(\tau_{11} - \tau_{22} - \tau_{12} + \tau_{21}) \quad (19)$$

If there are used the phase shift equivalent values and amplitude equivalent values when the incident light is made in line with the p'-polarization axis and s'-polarization axis (orthogonal polarization axes 16b) in the polarization separator 20, the polarization mode dispersion $\tau_{PMD}$ is obtained also using the equations (16) through (19). Namely, $\beta$ and $\gamma$ are obtained by respectively assigning $\tau_{\theta 11}$, $\tau_{\theta 22}$, $\tau_{\theta 12}$, and $\tau_{\theta 21}$ to $\tau_{11}$, $\tau_{22}$, $\tau_{12}$, and $\tau_{21}$ in the equations (18) and (19). Then, $\alpha$ is obtained by respectively assigning |T$_{\theta 11}$|$^2$ and |T$_{\theta 21}$|$^2$ to |T'$_{11}$|$^2$ and |T$_{21}$|$^2$ in the equation (17). The polarization mode dispersion $\tau_{PMD}$ is obtained by assigning $\alpha$, $\beta$, and $\gamma$ obtained in this way to the equation (16). Namely, the polarization mode dispersion $\tau_{PMD}$ can be obtained by using $\tau_{\theta 11}$, $\tau_{\theta 22}$, $\tau_{\theta 12}$, $\tau_{\theta 21}$, |T$_{\theta 11}$|$^2$, and |T$_{\theta 21}$|$^2$ in place of $\tau_{11}$, $\tau_{22}$, $\tau_{12}$, $\tau_{21}$, |T$_{11}$|$^2$, and |T$_{21}$|$^2$. It should be noted that a detailed description will be given of a proof of why the polarization mode dispersion $\tau_{PMD}$ can be obtained in this way later.

It should be noted that measurement values with better S/N ratios are selected between those obtained when the incident light is made in line with the p-polarization axis and s-polarization axis (16a), and those obtained when the incident light is made in line with the p'-polarization axis and s'-polarization axis (orthogonal polarization axes 16b) in the polarization separator 20 in the present embodiment. However, a plurality of p'-polarization axes and s'-polarization axes may be prepared (measured both under conditions of $\theta$=45° and 60°, for example), and values with better S/N ratios may be selected between values obtained under these conditions.

In addition, it is possible to measure the phase shift equivalent values and amplitude equivalent values obtained when the incident light is made in line with the p'-polarization axis and s'-polarization axis in the polarization separator 20 (S20) before to measure the phase shift equivalent values and amplitude equivalent values obtained when the incident light is made in line with the p-polarization axis and s-polarization axis (16a) in the polarization separator 20 (S10).

According to the embodiment of the present invention, the incident light is made in line with the orthogonal axes 16b including the p'-polarization axis and the s'-polarization axis which are respectively the p-polarization axis and s-polarization axis in the polarization separator 20 rotated by the certain angle $\theta$, and then, is made incident to the optical fiber 18. Consequently, it is possible to prevent the bias of the power in the p-polarization component and s-polarization component in the output of the polarization separator 20.

At the same time, the method which measures the polarization mode dispersion $\tau_{PMD}$ based on the result of making the incident light made in line with the orthogonal polarization axes 16b incident to the optical fiber 18 is similar to the method which measures the polarization mode dispersion $\tau_{PMD}$ based on the result of making the incident light made in line with the p-polarization axis and s-polarization axis in the polarization separator 20 incident to the optical fiber 18, and can measure the polarization mode dispersion $\tau_{PMD}$.

Second Embodiment

A second embodiment is different from the first embodiment in that the predetermined angle θ (rotational angle of the polarization axes) is set based on the amplitude equivalent values of the incident light which are the measurement results by the measuring unit 24.

Figure 5:
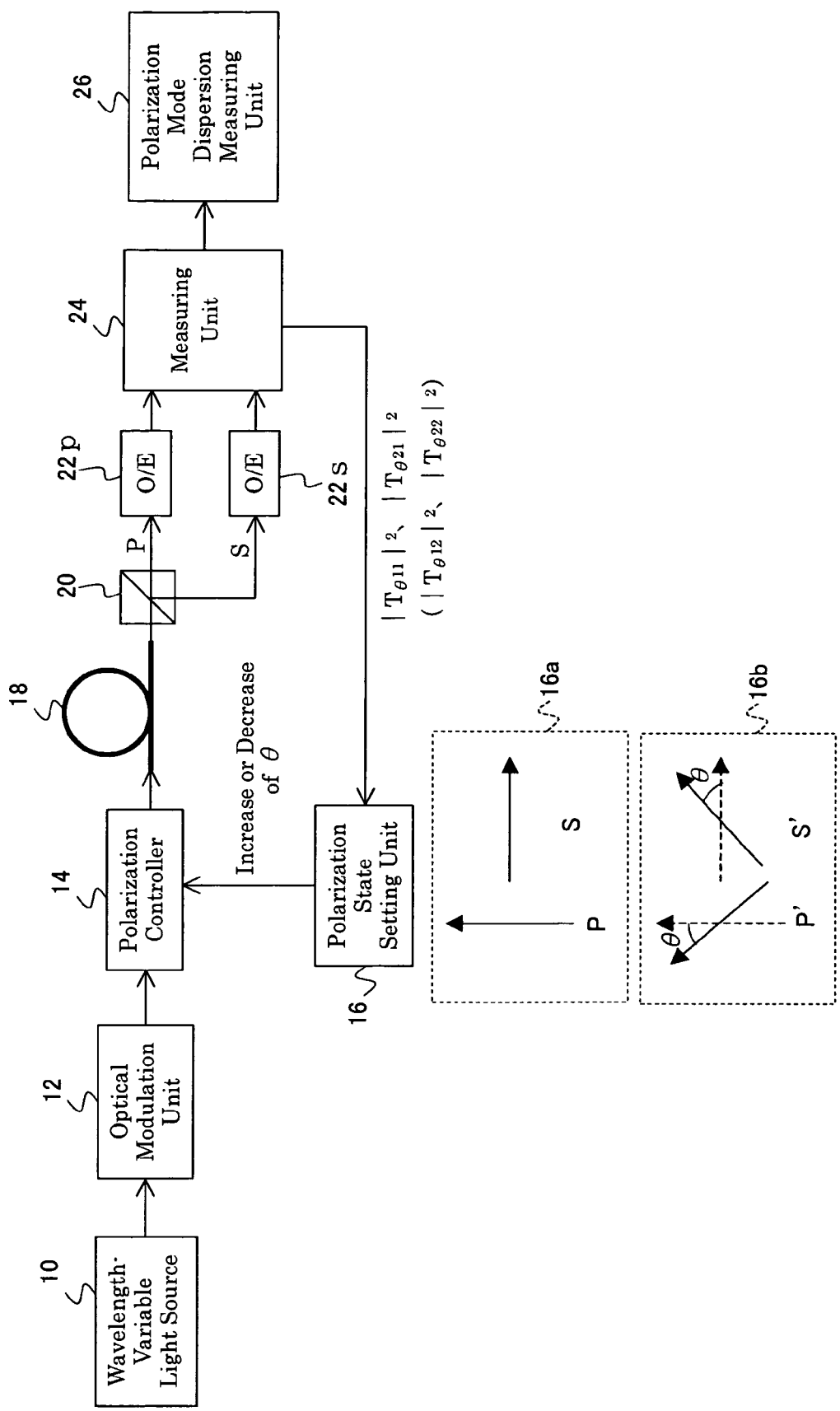
FIG. 5 is a block diagram showing the constitution of a polarization mode dispersion measuring device according to a second embodiment of the present invention.

FIG. 5 is a block diagram showing the constitution of a polarization mode dispersion measuring device according to a second embodiment of the present invention. The polarization mode dispersion measuring device according to the second embodiment of the present invention is intended for obtaining the polarization mode dispersion $\tau_{PMD}$ of an optical fiber 18, which is a device under test (DUT: Device Under Test). The polarization mode dispersion measuring device according to the second embodiment of the present invention is provided with a wavelength-variable light source (light generating means) 10, an optical modulation unit 12, a polarization controller (light input means) 14, a polarization state setting unit 16, a polarization separator 20, optical/electrical (O/E) converters 22p and 22s, a measuring unit 24, and a polarization mode dispersion measuring unit 26. In the following section, similar components are denoted by same numerals as of the first embodiment and will be explained in no more details.

A wavelength-variable light source (eight generating means) 10, an optical modulation unit 12, and a polarization controller (light input means) 14 are similar to those of the first embodiment, and a description will not be given of them.

A polarization state setting unit 16 is similar to that of the first embodiment. However, the predetermined angle θ is set based on the amplitude equivalent values of the incident light which are measurement results by a measuring unit 24. The measuring unit 24 measures squares of amplitudes, $|T_{\theta 11}|^2$ and $|T_{\theta 21}|^2$, and $|T_{\theta 12}|^2$ and $|T_{\theta 22}|^2$, which are the amplitude equivalent values of incident light. On this occasion, the polarization state setting unit 16 obtains ratios of a p component and an s component of the amplitude equivalent values, $|T_{\theta 11}|^2/|T_{\theta 21}|^2$ or $|T_{\theta 12}|^2/|T_{\theta 22}|^2$. If this ratio is excessively large, the p component is excessively large. If this ratio is excessively small, the s component is excessively small. Thus, the polarization state setting unit 16 compares $|T_{\theta 11}|^2/|T_{\theta 21}|^2$ or $|T_{\theta 12}|^2/|T_{\theta 22}|^2$ with an upper threshold and a lower threshold. If $|T_{\theta 11}|^2/|T_{\theta 21}|^2$ or $|T^{\theta 12}|^2/|T_{\theta 22}|^2$ is equal to or more than (or more than) the upper threshold, the ratio is too large, and if the ratio is equal to or less than (or less than) the lower threshold, the ratio is too small. If the p component or s component is too large, the predetermined angle θ is increased (or decreased). As the predetermined angle θ is changed in this way, the p component and s component finally become not too large.

A polarization separator 20, optical/electrical (O/E) converters 22p and 22s, a measuring unit 24, and a polarization mode dispersion measuring unit 26 are similar to those of the first embodiment, and a description is omitted. It should be noted that the measuring unit 24 transmits the amplitude equivalent values of the incident light $|T_{\theta 11}|^2$ and $|T_{\theta 21}|^2$, or $|T_{\theta 12}|^2$ and $|T_{\theta 22}|^2$ to the polarization state setting unit 16.

Figure 6:
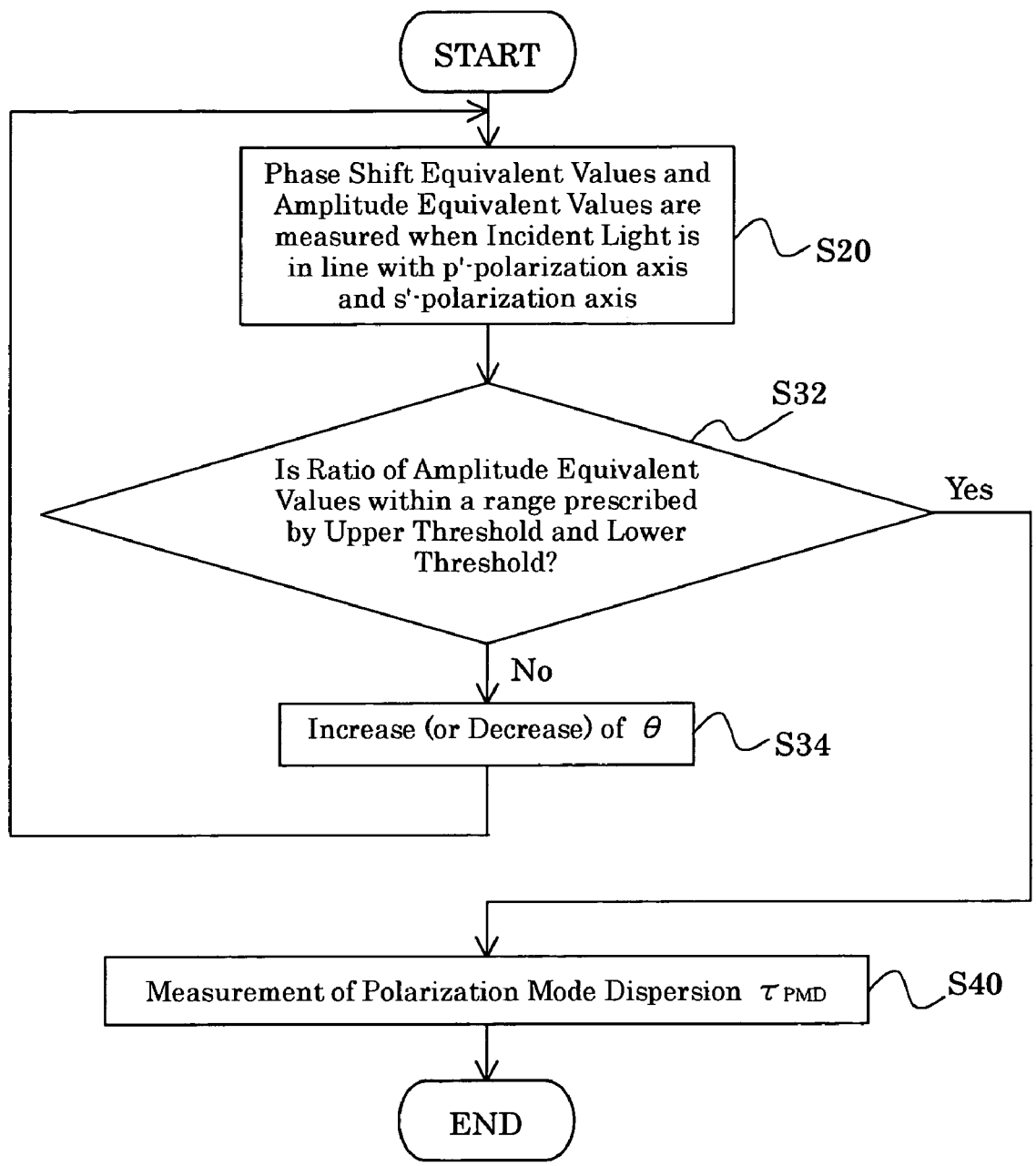
FIG. 6 is a flowchart showing an operation of the polarization mode dispersion measuring device according to the second embodiment of the present invention.
Figure 7:
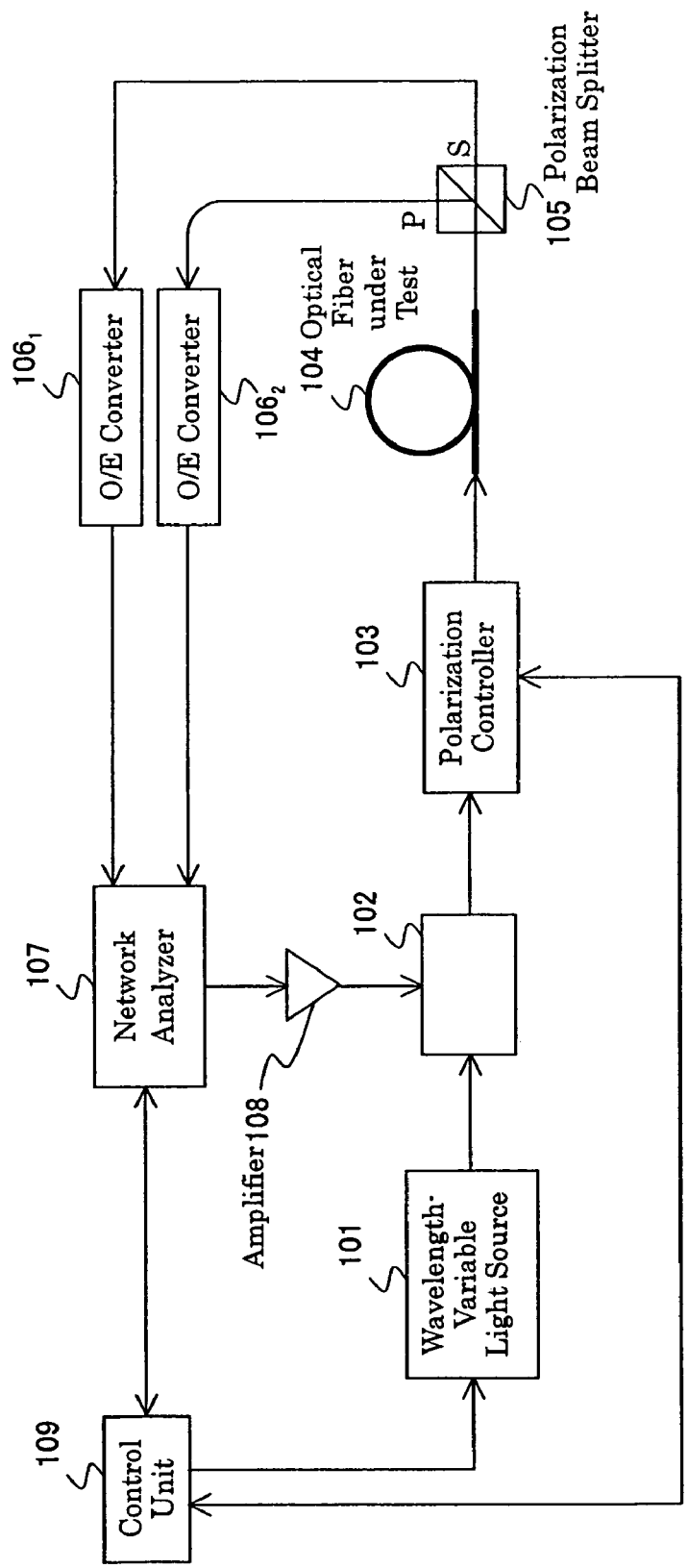
FIG. 7 is a block diagram showing the constitution of a polarization mode dispersion measuring device of optical fibers according to Japanese Patent Laid-Open Publication (Kokai) No. H09-264814.

A description will now be given of an operation of the polarization mode dispersion measuring device according to the second embodiment of the present invention with reference to a flowchart in FIG. 6.

First, the phase shift equivalent values and the amplitude equivalent values are measured when the incident light is in line with the p'-polarization axis and s'-polarization axis, namely orthogonal polarization axes 16b in the polarization separator 20 (S20). This procedure is similar to that of the first embodiment, and a description is omitted.

The amplitude equivalent values $|T_{\theta 11}|^2$ and $|T_{\theta 21}|^2$, or $|T_{\theta 12}|^2$ and $|T_{\theta 22}|^2$ are transmitted to the polarization state setting unit 16. The polarization state setting unit 16 determines $|T_{\theta 11}|^2/|T_{\theta 21}|^2$ or $|T_{\theta 12}|^2/|T_{\theta 22}|^2$ is within a range prescribed by the upper threshold and lower threshold (S32). If $|T_{\theta 11}|^2/|T_{\theta 21}|^2$ or $|T_{\theta 12}|^2/|T_{\theta 22}|^2$ is out of the range ("No" in S32), the ratio is more than (equal to or more than) the upper threshold, or less than (equal to or less than) the lower threshold. Therefore, the polarization state setting unit 16 increases the predetermined angle θ in order to avoid the bias of the power toward the p component (s component) (S34). It should be noted that the predetermined angle θ may be decreased. Then, the procedure returns to the measurement of the phase shift equivalent values and amplitude equivalent values when the incident light is in line with the orthogonal polarization axes 16b (S20).

As the predetermined angle θ is changed in this way, $|T_{\theta 11}|^2/|T_{\theta 21}|^2$ or $|T_{\theta 12}|^2/|T_{\theta 22}|^2$ will finally fall within the range prescribed by the upper threshold and lower threshold ("Yes" in S32). On this occasion, the bias of the power toward the p component (s component) is small, and thus, the polarization mode dispersion $\tau_{PMD}$ is measured (S40). Since the measurement of the polarization mode dispersion $\tau_{PMD}$ is similar to that of the first embodiment, a description will be omitted.

According to the second embodiment, the predetermined angle θ can be set to a proper value, namely a value which does not result in a power excessively biased toward the p component or s component, by means of so-called feedback, and thus, it is possible to prevent the bias of the power in the p-polarization component and s-polarization component in the output of the polarization separator 20.

It should be noted that the second embodiment may be combined with the first embodiment. For example, similarly to S30 in FIG. 2, measurement values with better S/N ratios may be selected between those obtained when the incident light is made in line with the p-polarization axis and s-polarization axis (16a) in the polarization separator 20, and those obtained when the predetermined angle θ is set to a proper value by means of so-called feedback.

In addition, the above-described embodiment can be realized in the following manner. A computer is provided with a CPU, a hard disk, and a media (such as a floppy disk and a CD-ROM) reader, and the media reader is made to read a medium recording a program realizing the above-described respective parts, the measuring unit 24 and the polarization mode dispersion measuring unit 26, for example, thereby installing the program on the hard disk. This method may realize the above-described functions.

[Proof of why $\tau_{PMD}$ can be obtained by using $\tau_\theta$ in place of $\tau$, and $|T_\theta|^2$ in place of $|T|^2$]

The polarization mode dispersion $\tau_{PMD}$ can be obtained by using $\tau_{\theta 11}, \tau_{\theta 22}, \tau_{\theta 12}, \tau_{\theta 21}, |T_{\theta 11}|^2$, and $|T_{\theta 21}|^2$ in place of $\tau_{11}, \tau_{22}, \tau_{12}, \tau_{21}, |T_{11}|^2$, and $|T_{21}|^2$. This is proved in the following way.

When the equation (11) is assigned to the equation (14) and equation (15), results represented by the following equations (20) through (23) are obtained:

$$T_{\theta 11}e^{-j\theta_{\theta 11}}=\cos\theta\cos\Theta e^{j(-\Phi-\phi)}-\sin\theta\sin\Theta e^{j(-\Phi+\phi)} \quad (20)$$

$$T_{\theta 12}e^{-j\theta_{\theta 12}}=-\sin\theta\cos\Theta e^{j(-\Phi-\phi)}-\cos\theta\sin\Theta e^{j(-\Phi+\phi)} \quad (21)$$

$$T_{\theta 21}e^{-j\theta_{\theta 21}}=\cos\theta\sin\Theta e^{j(\Phi-\phi)}+\sin\theta\cos\Theta e^{j(\Phi+\phi)} \quad (22)$$

$$T_{\theta 22}e^{-j\theta_{\theta 22}}=-\sin\theta\sin\Theta e^{j(\Phi-\phi)}+\cos\theta\cos\Theta e^{j(\Phi+\phi)} \quad (23)$$

The equations (20) through (23) are parameters of the matrix, and the amplitude equivalent values (squares of the amplitude) of these parameters are represented by the following equations (24) through (27). In addition, the phases thereof are represented by the following equations (28) through (31).

$$|T_{\theta 11}|^2 = (\cos^2\Theta\cos^2\theta + \sin^2\Theta\sin^2\theta - 2\sin\theta\sin\Theta\cos\theta\cos\Theta\cos 2\varphi) \quad (24)$$

$$|T_{\theta 12}|^2 = (\sin^2\Theta\cos^2\theta + \cos^2\Theta\sin^2\theta + 2\sin\theta\sin\Theta\cos\theta\cos\Theta\cos 2\varphi) \quad (25)$$

$$|T_{\theta 21}|^2 = (\cos^2\Theta\sin^2\theta + \sin^2\Theta\cos^2\theta + 2\sin\theta\sin\Theta\cos\theta\cos\Theta\cos 2\varphi) \quad (26)$$

$$|T_{\theta 22}|^2 = (\cos^2\Theta\cos^2\theta + \sin^2\Theta\sin^2\theta - 2\sin\theta\sin\Theta\cos\theta\cos\Theta\cos 2\varphi) \quad (27)$$

$$\theta_{\theta 11} = -\tan^{-1}\left(\frac{-\cos\theta\cos\Theta\sin(\phi+\varphi)+\sin\theta\sin\Theta\sin(\phi-\varphi)}{\cos\theta\cos\Theta\cos(\phi+\varphi)-\sin\theta\sin\Theta\cos(\phi-\varphi)}\right) \quad (28)$$

$$\theta_{\theta 12} = -\tan^{-1}\left(\frac{\sin\theta\cos\Theta\sin(\phi+\varphi)+\sin\theta\sin\Theta\sin(\phi-\varphi)}{-\sin\theta\cos\Theta\cos(\phi+\varphi)-\cos\theta\sin\Theta\cos(\phi-\varphi)}\right) \quad (29)$$

$$\theta_{\theta 21} = -\tan^{-1}\left(\frac{\cos\theta\sin\Theta\sin(\phi-\varphi)+\sin\theta\cos\Theta\sin(\phi+\varphi)}{\cos\theta\sin\Theta\cos(\phi-\varphi)+\sin\theta\cos\Theta\cos(\phi+\varphi)}\right) \quad (30)$$

$$\theta_{\theta 22} = -\tan^{-1}\left(\frac{-\sin\theta\sin\Theta\sin(\phi-\varphi)+\cos\theta\cos\Theta\sin(\phi+\varphi)}{-\sin\theta\sin\Theta\cos(\phi-\varphi)+\cos\theta\cos\Theta\cos(\phi+\varphi)}\right) \quad (31)$$

The following equations (32) through (35) hold based on the equations (24) through (27):

$$|T_{\theta 11}|^2+|T_{\theta 21}|^2=1 \quad (32)$$

$$|T_{\theta 12}|^2+|T_{\theta 22}|^2=1 \quad (33)$$

$$|T_{\theta 11}|^2=|T_{\theta 22}|^2 \quad (34)$$

$$|T_{\theta 12}|^2=|T_{\theta 21}|^2 \quad (35)$$

The squares of the respective amplitudes are represented by the following equations (36) based on the equations (32) through (35):

$$|T_{\theta 11}|^2=|T_{\theta 22}|^2=\cos^2\Theta_\theta$$

$$|T_{\theta 12}|^2=|T_{\theta 21}|^2=\sin^2\Theta_\theta \quad (36)$$

On this occasion, using a formula represented by the following equation (37), the group delays $\tau_{\theta 11}$, $\tau_{\theta 12}$, $\tau_{\theta 21}$, and $\tau_{\theta 22}$ are represented by the following equations (38) through (41):

$$(\tan^{-1}x(\omega))' = \frac{x'}{1+x^2} \quad (37)$$

$$\tau_{\theta 11} = \frac{d}{d\omega}\theta_{\theta 11} \quad (38)$$

$$= \frac{(\beta+\gamma)\cos^2\theta\cos^2\Theta + (\beta-\gamma)\sin^2\theta\sin^2\Theta - A}{|T_{\theta 11}|^2}$$

$$\tau_{\theta 12} = \frac{d}{d\omega}\theta_{\theta 11} \quad (39)$$

$$= \frac{(\beta+\gamma)\sin^2\theta\cos^2\Theta + (\beta-\gamma)\cos^2\theta\sin^2\Theta + A}{|T_{\theta 12}|^2}$$

$$\tau_{\theta 21} = \frac{d}{d\omega}\theta_{\theta 11} \quad (40)$$

$$= \frac{-(\beta-\gamma)\cos^2\theta\sin^2\Theta - (\beta+\gamma)\sin^2\theta\sin^2\Theta - A}{|T_{\theta 12}|^2}$$

$$\tau_{\theta 22} = \frac{d}{d\omega}\theta_{\theta 11} \quad (41)$$

$$= \frac{-(\beta-\gamma)\sin^2\theta\sin^2\Theta - (\beta+\gamma)\cos^2\theta\cos^2\Theta + A}{|T_{\theta 22}|^2}$$

where A is represented by the following equation (42):

$$A=\sin\theta\cos\theta\{\alpha\sin(2\phi)-2\beta\cos\Theta\sin\Theta\cos(2\phi)\} \quad (42)$$

The powers measured by the measuring unit 24 are products of the respective equations (24) through (27) and a transmission power characteristic $U^2$. In the same manner, the group delays are sums of the respective equations (28) through (31) and a group delay $\Phi_1$.

These $T_{\theta 11}$, $T_{\theta 12}$, $T_{\theta 21}$, $T_{\theta 22}$, $\tau_{\theta 11}$, $\tau_{\theta 12}$, $\tau_{\theta 21}$, and $\tau_{\theta 22}$ are assigned to the equation of the polarization mode dispersion (equation (16)). Then, the polarization mode dispersion is represented by:

$$\tau_{PMD\theta} = 2\sqrt{\alpha_\theta^2 + \beta_\theta^2 + \gamma_\theta^2 + 2\beta_\theta\gamma_\theta\cos 2\Theta_\theta} \quad (43)$$

$$\alpha_\theta = \frac{1}{2}\frac{d}{d\varpi}\left(\cos^{-1}\sqrt{\frac{|T_{\theta 11}|^2}{|T_{\theta 11}|^2+|T_{\theta 21}|^2}}\right) \quad (44)$$

$$\beta_\theta = \frac{\tau_{\theta 11} - \tau_{\theta 22} + \tau_{\theta 12} - \tau_{\theta 21}}{4} \quad (45)$$

$$\gamma_\theta = \frac{\tau_{\theta 11} - \tau_{\theta 22} - \tau_{\theta 12} + \tau_{\theta 21}}{4} \quad (46)$$

Then, the polarization mode dispersion is calculated by transformation represented by the following equation (47):

$$\tau_{PMD\theta}=2\sqrt{\alpha_\theta^2+\gamma_\theta^2\sin^2 2\Theta_\theta+(\beta+\gamma\cos 2\Theta)^2} \quad (47)$$

First, a part $\alpha_\theta^2 + \gamma_\theta^2 \sin^2 2\Theta_\theta$ of the equation (47) is obtained.

$$(\cos^{-1}x(\omega))' = -\frac{x'}{\sqrt{1-x^2}} \quad (48)$$

Using a formula represented by the preceding equation (48), $\alpha_\theta$ is represented by the following equation (49):

$$\alpha_\theta = -\frac{\frac{d}{d\omega}|T_1|}{\sqrt{1-|T_1|^2}} = -\frac{\frac{d}{d\omega}(|T_1|^2)}{2|T_1||T_2|} \quad (49)$$

In addition, $\gamma_\theta \sin 2\Theta_\theta$ is represented by the following equation (50):

$$\gamma_\theta \sin 2\Theta_\theta = \frac{\tau_{\theta 11} - \tau_{\theta 22} - \tau_{\theta 12} + \tau_{\theta 21}}{4} \sin 2\Theta_\theta \quad (50)$$

$$= \frac{(\tau_{\theta 11} - \tau_{\theta 22})|T_2|^2 - (\tau_{\theta 12} - \tau_{\theta 21})|T_1|^2}{2|T_1||T_2|}$$

Consequently, $\alpha_\theta^2 + \gamma_\theta^2 \sin^2 2\Theta_\theta$ is represented by the following equation (51):

$$\alpha_\theta^2 + \gamma_\theta^2 \sin^2 2\Theta_\theta = \quad (51)$$

$$\frac{1}{4|T_1|^2|T_2|^2}\left[\left\{\frac{d}{d\omega}(|T_1|^2)\right\}^2 + \{(\tau_{\theta 11} - \tau_{\theta 22})|T_2|^2 - (\tau_{\theta 12} - \tau_{\theta 21})|T_1|^2\}^2\right]$$

A first term of the numerator on the right side of the equation (51) is represented by the following equation (52):

First term of numerator:

$$\left\{\frac{d}{d\omega}(|T_1|^2)\right\}^2 = \quad (52)$$

$$(-\alpha \sin 2\Theta \cos 2\Theta - \alpha 2 \sin 2\theta \cos 2\varphi + 2\beta \sin 2\theta \sin 2\varphi)^2$$

A second term of the numerator on the right side of the equation (51) is represented by the following equation (53):

Second term of numerator:

$$(\tau_{\theta 11} - \tau_{\theta 22})|T_2|^2 - (\tau_{\theta 12} - \tau_{\theta 21})|T_1|^2 = 2[(-\beta - \gamma)\cos^2\Theta$$
$$\cos^2\Theta + 2(-\beta+\gamma)\sin^2\Theta \sin^2\Theta + A]^2 \times (\sin^2\Theta \cos^2$$
$$\theta + \cos^2\Theta \sin^2\theta + 2\sin\theta\sin\Theta\cos\theta\cos\Theta\cos$$
$$2\phi) + 2[(-\beta-\gamma)\sin^2\Theta \cos^2\Theta + 2(-\beta+\gamma)\cos^2\Theta \sin^2$$
$$\theta - A]^2 \times (\cos^2\Theta \cos^2\theta + \sin^2\Theta \sin^2\theta - 2\sin\theta\sin$$
$$\Theta\cos\theta\cos\Theta\cos 2\phi) = -(\beta+\gamma\cos 2\Theta)\sin 2\Theta \sin$$
$$2\theta\cos 2\phi + \alpha\sin 2\theta\sin 2\phi + \beta\sin 2\theta\sin 2\Theta$$
$$\cos 2\phi \quad (53)$$

The denominator on the right side of the equation (51) is represented by the following equation (54).

Denominator:

$$|T_1|^2|T_2|^2 = (\cos^2\Theta\cos^2\theta + \sin^2\Theta\sin^2\theta + 2\sin\theta\sin\Theta\cos\theta\cos\Theta\cos 2\varphi) \times \quad (54)$$

$$(\sin^2\Theta\cos^2\theta + \cos^2\Theta\sin^2\theta - 2\sin\theta\sin\Theta\cos\theta\cos\Theta\cos 2\varphi)$$

$$= \frac{1}{4}[1 - \cos 2\theta\cos 2\alpha + \sin 2\theta\sin 2\alpha\cos 2\varphi] \times$$

$$[1 + \cos 2\theta\cos 2\alpha - \sin 2\theta\sin 2\alpha\cos 2\varphi]$$

Consequently, $\alpha_\theta^2 + \gamma_\theta^2 \sin^2 2\Theta_\theta$ is represented by the following equation (55):

$$\alpha_\theta^2 + \gamma_\theta^2 \sin^2 2\Theta_\theta = \frac{[\alpha^2 + \gamma^2\sin^2 2\Theta][1 - \cos 2\theta\cos 2\alpha + \sin 2\theta\sin 2\alpha\cos 2\varphi] \times [1 + \cos 2\theta\cos 2\alpha - \sin 2\theta\sin 2\alpha\cos 2\varphi]}{[1 - \cos 2\theta\cos 2\alpha + \sin 2\theta\sin 2\alpha\cos 2\varphi] \times [1 + \cos 2\theta\cos 2\alpha - \sin 2\theta\sin 2\alpha\cos 2\varphi]} \quad (55)$$

$$= [\alpha^2 + \gamma^2\sin^2 2\Theta]$$

Then, a part $\beta_\theta + \gamma_\theta \cos 2\Theta_\theta$ of the equation (47) is obtained, and is represented as the following equation (56):

$$\beta_\theta + \gamma_\theta\cos 2\Theta_\theta = \frac{\tau_{\theta 11} - \tau_{\theta 22} + \tau_{\theta 12} - \tau_{\theta 21}}{4} + \frac{\tau_{\theta 11} - \tau_{\theta 22} - \tau_{\theta 12} + \tau_{\theta 21}}{4}\cos 2\Theta_\theta \quad (56)$$

$$= \frac{\tau_{\theta 11} - \tau_{\theta 22}}{2}\cos^2\Theta_\theta + \frac{\tau_{\theta 12} - \tau_{\theta 21}}{2}\sin^2\Theta_\theta$$

$$= \{(\beta+\gamma)\cos^2\theta\cos^2\Theta + (\beta-\gamma)\sin^2\theta\sin^2\Theta - A\} +$$

$$\{(\beta+\gamma)\sin^2\theta\cos^2\Theta + (\beta-\gamma)\cos^2\theta\sin^2\Theta + A\}$$

$$= \beta(\cos^2\theta\cos^2\Theta + \sin^2\theta\sin^2\Theta + \sin^2\theta\cos^2\Theta + \cos^2\theta\sin^2\Theta) +$$

$$\gamma(\cos^2\theta\cos^2\Theta - \sin^2\theta\sin^2\Theta - \sin^2\theta\cos^2\Theta + \cos^2\theta\sin^2\Theta)$$

$$= \beta + \gamma\cos 2\Theta$$

Consequently, there holds the following equation (57):

$$\tau_{PMD\theta} = 2\sqrt{\alpha_\theta^2 + \beta_\theta^2 + \gamma_\theta^2 + 2\beta_\theta\gamma_\theta\cos 2\Theta_\theta} \quad (57)$$

$$= 2\sqrt{\alpha^2 + \beta^2 + \gamma^2 + 2\beta\gamma\cos 2\Theta}$$

As a result, $\tau_{PMD\theta} = \tau_{PMD}$, and thus, even if the linear polarization state of the input is at an arbitrary angle, an obtained polarization mode dispersion remains the same. Consequently, the polarization mode dispersion $\tau_{PMD}$ can be obtained by using $\tau_{\theta 11}, \tau_{\theta 22}, \tau_{\theta 12}, \tau_{\theta 21}, |T_{\theta 11}|^2$, and $|T_{\theta 21}|^2$ in place of $\tau_{11}, \tau_{22}, \tau_{12}, \tau_{21}, |T_{11}|^2$, and $|T_{21}|^2$.

[End of Proof]

According to the present invention, the incident light is made in line with orthogonal polarization axes which are the p-polarization axis and s-polarization axis in the polarization separating means rotated by a certain angle, and then is made incident to a device under test. Consequently, it is possible to prevent the bias of the power in the p-polarization component and s-polarization component in the output of the polarization separating means.

At the same time, the method which measures the polarization mode dispersion based on the result of making the incident light made in line with the orthogonal polarization axes incident to the device under test is similar to the method which measures the polarization mode dispersion based on the result of making the incident light made in line with the p-polarization axis and s-polarization axis in the polarization separating means incident to the device under test, and can measure the polarization mode dispersion.

The invention claimed is:

1. A polarization mode dispersion measuring device for measuring polarization mode dispersion of an device under test comprising:

a polarization separating means for receiving light having emitted from said device under test, separating said received light into p-polarized light and s-polarized light, and outputting the p-polarized light and s-polarized light;

a light generating means for generating incident light;

an optical modulation means for applying said incident light with intensity modulation, and emitting modulated light;

a light input means for making said incident light having been applied with the intensity modulation in line with orthogonal polarization axes which are said p-polarization axis and said s-polarization axis in said polarization separating means rotated by a predetermined angle, and then, making the resulting incident light incident to said device under test;

a measuring means for measuring phase shift equivalent values and amplitude equivalent values of said incident light based on the output of said polarization separating means; and a polarization mode dispersion measuring means for measuring the polarization mode dispersion of said device under test based on the measurement result of said measuring means.

2. The polarization mode dispersion measuring device according to claim 1, wherein said light input means for making said incident light in line with said orthogonal polarization axes, further making said incident light in line with said p-polarization axis and said s-polarization axis, and then, making the resulting incident light incident to said device under test.

3. The polarization mode dispersion measuring device according to claim 2, wherein said phase shift equivalent value is obtained by differentiating a phase shift by an optical angular frequency.

4. The polarization mode dispersion measuring device according to claim 2, wherein said amplitude equivalent value is the square of an amplitude.

5. The polarization mode dispersion measuring device according to claim 1, wherein said predetermined angle is determined based on the measurement result of said measuring means.

6. The polarization mode dispersion measuring device according to claim 5, wherein said phase shift equivalent value is obtained by differentiating a phase shift by an optical angular frequency.

7. The polarization mode dispersion measuring device according to claim 5, wherein said amplitude equivalent value is the square of an amplitude.

8. The polarization mode dispersion measuring device according to claim 1, wherein said phase shift equivalent value is obtained by differentiating a phase shift by an optical angular frequency.

9. The polarization mode dispersion measuring device according to claim 1, wherein said amplitude equivalent value is the square of an amplitude.

10. A polarization mode dispersion measuring method for measuring polarization mode dispersion of a device under test comprising:

a polarization separating step of receiving light having emitted from said device under test, separating said received light into p-polarized light and s-polarized light, and outputting the p-polarized light and s-polarized light;

light generating step of generating incident light;

an optical modulating step of applying said incident light with intensity modulation, and emitting modulated light;

a light input step of making said incident light having been applied with the intensity modulation in line with orthogonal polarization axes which are said p-polarization axis and said s-polarization axis in said polarization separating step rotated by a predetermined angle, and then, making the resulting incident light incident to said device under test;

a measuring step of measuring phase shift equivalent values and amplitude equivalent values of said incident light based on the output of said polarization separating step; and a polarization mode dispersion measuring step of measuring the polarization mode dispersion of said device under test based on the measurement result of said measuring step.

11. The polarization mode dispersion measuring method according to claim 10 wherein:

there exist a plurality of said pairs of orthogonal polarization axes, and said polarization mode dispersion measuring step selects said measurement result used for the measurement of the polarization mode dispersion by comparing S/N ratios of measurement results corresponding to the respective pairs of orthogonal polarization axes.

12. The polarization mode dispersion measuring step according to claim 10, wherein:

said light input step includes a step of making said incident light in line with said orthogonal polarization axes, and then, making the resulting incident light incident to said device under test, and a step of making said incident light in line with said p-polarization axis and said s-polarization axis, and then, making the resulting incident light incident to said device under test, and wherein;

said polarization mode dispersion measuring step selects said measurement result used for the measurement of the polarization mode dispersion by comparing S/N ratios of the measurement result when said incident light is made in line with said orthogonal polarization axes, and an S/N ratio of the measurement result when said incident light is made in line with said p-polarization axis and said s-polarization axis.

13. A computer-readable medium having a program of instructions for execution by the computer to perform a polarization mode dispersion measuring process of a polarization mode dispersion measuring device having:

a polarization separating means for receiving light having emitted from said device under test, separating said received light into p-polarized light and s-polarized light, and outputting the p-polarized light and s-polarized light;

a light generating means for generating incident light;

an optical modulation means for applying said incident light with intensity modulation, and emitting modulated light;

a light input means for making said incident light having been applied with the intensity modulation in line with orthogonal polarization axes which are said p-polarization axis and said s-polarization axis in said polarization separating means rotated by a predetermined angle, and then, making the resulting incident light incident to said device under test, said polarization mode dispersion measuring process comprising:

a measuring step for measuring phase shift equivalent values and amplitude equivalent values of said incident light based on the output of said polarization separating step; and a polarization mode dispersion measuring step for measuring the polarization mode dispersion of said device under test based on the measurement result of said measuring step.

* * * * *